United States Patent [19]

Mischke et al.

[11] 4,160,764
[45] Jul. 10, 1979

[54] WATER-INSOLUBLE MONOAZO-DYESTUFFS FOR SYNTHETIC FIBROUS MATERIALS

[75] Inventors: Peter Mischke, Neuenhain; Erwin Fleckenstein, Hofheim; Reinhard Mohr, Offenbach am Main, all of Fed. Rep. of Germany

[73] Assignee: Hoechst Aktiengesellschaft, Frankfurt am Main, Fed. Rep. of Germany

[21] Appl. No.: 894,177

[22] Filed: Apr. 6, 1978

Related U.S. Application Data

[63] Continuation of Ser. No. 692,728, Jun. 4, 1976, abandoned.

[30] Foreign Application Priority Data

Jun. 7, 1975 [DE] Fed. Rep. of Germany ....... 2525557

[51] Int. Cl.² .................. C09B 29/26; C09B 31/08
[52] U.S. Cl. ................................ 260/206; 260/162; 260/158; 260/186; 260/187; 260/207; 260/465 D; 260/465 E; 260/559 A; 560/19; 560/43
[58] Field of Search ................ 260/207, 207.1, 206

[56] References Cited

U.S. PATENT DOCUMENTS

| 2,218,247 | 10/1940 | McNally et al. ............... 260/206 X |
| 2,633,461 | 3/1953 | Seidenfaden et al. ......... 260/207.1 X |
| 3,962,209 | 6/1976 | Gotteschlich et al. ........ 260/207.1 X |

FOREIGN PATENT DOCUMENTS

| 770115 | 10/1967 | Canada .................................. 260/207.1 |
| 1511933 | 2/1968 | France .................................. 260/207.1 |

*Primary Examiner*—Charles F. Warren
*Attorney, Agent, or Firm*—Curtis, Morris & Safford

[57] ABSTRACT

Azo-dyestuff of the formula

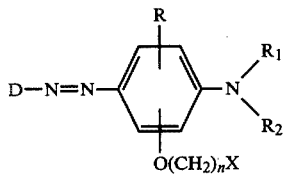

in which D represents nitrophenylene,

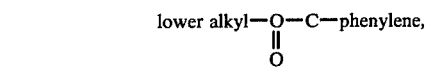

dinitro-phenylene, nitro-cyano-phenylene, nitro-chloro-phenylene, nitro-bromo-phenylene, trichloro-phenylene, nitro-dichloro-phenylene, dinitro-chloro-phenylene, dinitro-cyano-phenylene, nitro-bromo-cyano-phenylene, dinitro-bromo-phenylene, phenylazo-phenylene,

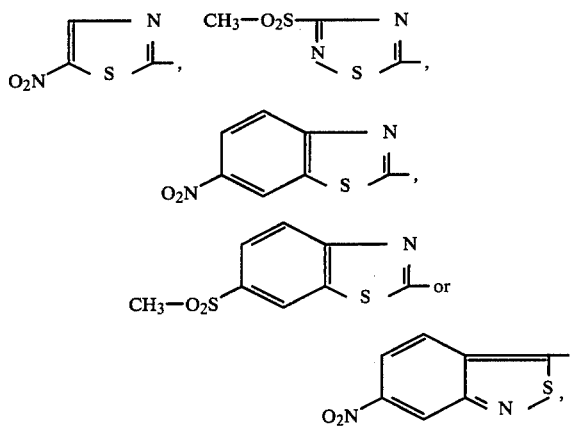

R represents hydrogen, chlorine, lower alkyl, lower alkoxy, —O—CH$_2$—CN, —NH—CO—lower alkyl, —NH—COO lower alkyl or

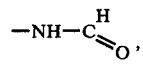

n stands for the integer 1 or 2, X represents cyano, —CO—NH$_2$ or —COO-lower alkyl, R$_1$ represents hydrogen, lower alkyl, lower alkylene-OH, lower alkylene-CN, lower alkylene-OCO-lower alkyl or lower alkenyl, and R$_2$ represents lower alkyl, lower alkylene-O-CO-lower alkyl or lower alkylene-COO-lower alkyl, said dyestuffs being suitable for the dyeing or printing of synthetic fibrous materials, such as fibers of cellulose-di-, -2½- or -triacetat, polyamides, polyurethanes, polyolefines, polycarbonates and particularly of linear polyesters, the dyeings or prints obtained being distinguished by a very good build up, tinctorial strength and a series of very good fastness properties.

5 Claims, No Drawings

WATER-INSOLUBLE MONOAZO-DYESTUFFS FOR SYNTHETIC FIBROUS MATERIALS

This is a continuation of application Ser. No. 692,728, filed June 4, 1976, now abandoned.

The present invention relates to water-insoluble azo dyestuffs, a process for their preparation and their use.

The new, valuable azo dyestuffs, only sparingly water-soluble, correspond to the general formula (1)

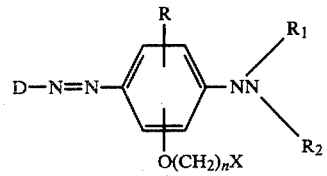
(1)

wherein D is the radical of a diazo component free of water-solubilizing groups of the aromatic or heterocyclic series, for example, of the benzene, naphthalene, thiazole, benzthiazole, benzisothiazole, indazole and thiadiazole series, which may be substituted, for example by halogen atoms, such as fluorine, chlorine or bromine atoms, by nitro, cyano, alkyl, trifluoromethyl, alkoxy, phenoxy, arylazo- (such as phenyl azo), alkylsulfonyl, alkenylsulfonyl, acyl (such as acetyl or benzoyl), carboxylic acid alkyl ester, carboxylic acid phenyl ester, sulfamyl, N-monoalkylaminosulfonyl, N,N-dialkylaminosulfonyl, carbamyl, N-monoalkylcarbamyl and/or N,N-dialkylcarbamyl groups, the alkyl and alkoxy groups mentioned containing 1 to about 4 carbon atoms each, X is the cyano, carbonamide or carboxylic acid ester group, n is 1 or 2, R is hydrogen, halogen, for example chlorine or bromine, the alkyl, alkoxy, phenoxy or —O(CH$_2$)$_n$X radical, X and n being defined as above, and, if n is 1, the formylamino, acetylamino, benzoylamino, ureido, —NHCOO-alkyl, —NH—CO—CH$_2$—CH$_2$—O-alkyl, alkylsulfonyl, alkylsulfonylamino, alkenylsulfonylamino or arylsulfonylamino group, such as the phenylsulfonylamino group, the alkyl, alkenyl and alkoxy groups mentioned containing 1 to about 4 carbon atoms, R$_1$ and R$_2$ each is hydrogen or an alkyl, alkenyl, cyclohexyl, benzyl, phenylethyl, cyanalkyl, hydroxyalkyl, acyloxyalkyl, alkylene-COO-alkyl, alkylene-OCOO-alkyl, and/or a chloroalkyl radical, or R$_1$ and R$_2$ together with the nitrogen atom, are a heterocyclic radical, for example a morpholine radical, the alkyl and alkylene groups containing 1 to about 4 carbon atoms each.

The present invention also relates to a process for the preparation of the compounds of the invention.

In this process, an amine of the formula (2)

D—NH$_2$ (2)

wherein D is defined as above, is diazotized in known manner and coupled with a coupling component of the general formula (3)

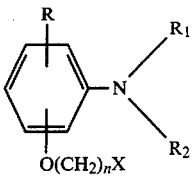
(3)

wherein X, n, R, R$_1$ and R$_2$ are defined as above.

The amines, on which the diazonium compounds to be used are based, are, for example:

4-nitraniline, 2-chloro-4-nitraniline, 2-bromo-4-nitraniline, 2-cyano-4-nitraniline, 2,4-dinitraniline, 2-methylsulfonyl-4-nitraniline, 2,6-dichloro-4-nitraniline, 2,6-dibromo-4-nitraniline, 2,4-dinitro-6-chloroaniline, 2,4-dinitro-6-bromoaniline, 2-cyano-4-nitro-6-chloroaniline, 2-cyano-4-nitro-6-bromoaniline, 2-cyano-4,6-dinitroaniline, 2,6-dicyano-4-nitroaniline, 4-aminoazobenzene, aniline, p-toluidine, o-anisidine, m-anisidine, p-anisidine, p-phenetidine, p-phenoxyaniline, 2-, 3- and 4-fluoroaniline, 2-, 3- and 4-chloroaniline, 2-, 3- and 4-bromoaniline, 2-, 3- and 4-trifluoromethyl-aniline, 2,4-dichloroaniline, 2,4-dibromoaniline, 2,5-dichloroaniline, 2,5-dibromoaniline, 3,4-dichloroaniline, 2,6-dichloroaniline, 2,4,5-trichloroaniline, 2,4,6-trichloroaniline, 2,4,6-tribromoaniline, 2,4-dichloro-6-nitroaniline, 2-cyano-, 3-cyano- and 4-cyano-aniline, 2,4-dicyano-aniline, 2,5-dicyano-aniline, 4-cyano-2-nitroaniline, 4-chloro- and 4-bromo-2-nitroaniline, 4-methyl-2-nitroaniline, 4-methoxy-2-nitroaniline, 4-trifluoromethyl-2-nitroaniline, 4-methylsulfonyl-2-nitroaniline, 2-methyl-4-nitroaniline, 2-methoxy-4-nitroaniline, anthranilic acid methyl- and ethyl ester, 3-aminobenzoic acid methyl- and ethyl ester, 4-aminobenzoic acid methyl- and ethyl ester, 4-aminobenzoic acid phenyl ester, 2-, 3- and 4-methylsulfonyl-aniline, 4-ethylsulfonyl-aniline, 2-amino-, 3-amino- and 4-amino-phenylsulfonamide, 4-aminophenylsulfonic acid dimethyl amide, 2-amino-, 3-amino- and 4-aminoacetophenone, 2-amino-, 3-amino- and 4-aminobenzophenone, 2-, and 3- and 4-acetamino-aniline, 2- and 3-nitroaniline, 2-amino-5-nitro-benzoic acid methyl- and ethyl ester, 2-amino-5-nitro-phenylsulfonamide, 2-acetamino-4-nitroaniline, 2-trifluoromethyl-4-nitroaniline, 2-chloro-6-methoxy-4-nitroaniline, 2-amino-3-chloro-5-nitro-benzoic acid methyl ester, 2-methylsulfonyl-6-chloro-4-nitroaniline, 2-trifluoromethyl-6-chloro-4-nitroaniline, 2-amino-3-methoxy-5-nitro-benzoic acid methyl ester, 2-cyano-6-methoxy-4-nitroaniline, 2,4-dinitro-6-methoxy-aniline, 2-amino-3-cyano-5-nitro-benzoic acid methyl ester, 2-amino-3,5-dinitro-benzoic acid methyl ester, 2-amino-3-bromo-4-nitro-benzoic acid methyl ester, 2-cyano-6-methylsulfonyl-4-nitroaniline, 2-methylsulfonyl-4,6-dinitroaniline, 2-cyano-6-trifluoromethyl-4-nitroaniline, 2,4,6-trinitroaniline, 2-trifluoromethyl-4,6-dinitroaniline, 2-aminothiazole, 5-nitro-2-aminothiazole, 5-carbethoxy-2-aminothiazole, 5-cyano-2-aminothiazole, 2-aminobenzothiazole, 6-nitro-2-aminobenzothiazole, 6-cyano-2-aminobenzothiazole, 6-methylsulfonyl-2-aminobenzothiazole, 6-chloro-2-aminobenzothiazole, 6-methyl-2-aminobenzothiazole, 6-methoxy-2-aminobenzothiazole, 3-amino-5-nitro-2,1-benzoisothiazole, 2-amino-1,3,4-thiadiazole and 3-aminoindazole.

New, valuable dyestuffs which belong to the formula (1) mentioned above are those of the general formula (4)

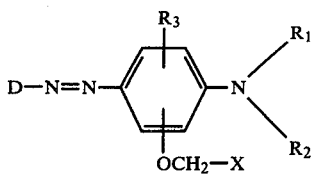

(4)

wherein D, $R_1$ and $R_2$ are defined as above, X is the cyano or carbonamide group and $R_3$ is hydrogen, halogen, the alkyl, alkoxy, phenoxy, —OCH$_2$CN— or —OCH$_2$—CONH$_2$ radical, the alkyl and alkoxy groups containing 1 to about 4 carbon atoms each.

Especially valuable, new dyestuffs which belong to the formula (1) mentioned above, are those of the general formula (5)

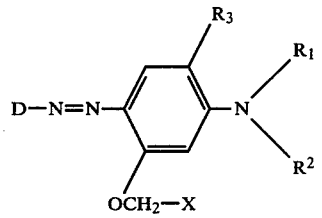

(5)

wherein D, $R_1$, $R_2$ and $R_3$ are defined as above, and X is the cyano or carbonamide group.

The coupling components used according to the invention and corresponding to the formula (3) can be obtained according to known methods, for example as illustrated in the following formula scheme, wherein X, n, R, $R_1$ and $R_2$ are defined as above:

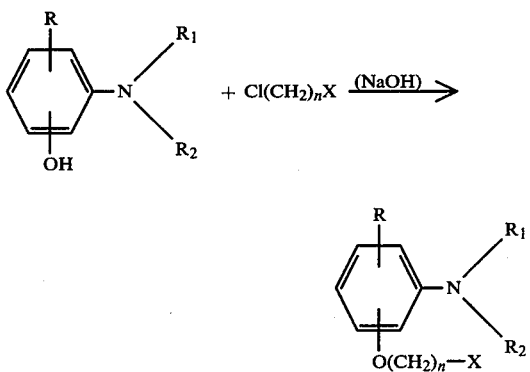

or, if n is 2, according to the following scheme:

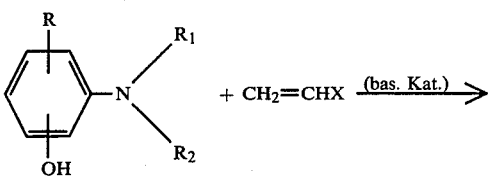

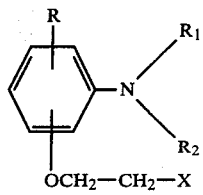

A suitable basic catalyst is, for example, trimethylbenzylammonium hydroxide.

The dyestuffs are prepared in known manner by coupling in the acid to neutral, preferably aqueous medium, optionally by adding solvents, for example lower alcohols, acetone or glacial acetic acid, and with additives of acid-binding agents, such as sodium acetate or similar buffer substances or catalysts exercising an influence on the coupling speed, for example pyridine or dimethyl formamide. The new dyestuffs, which are obtained in the form of water-insoluble, crystalline substances, are separated by filtration and freed from electrolytes by washing with water.

Instead of one type of diazo component alone, a mixture of two or more diazo components, and instead of one type of coupling component alone a mixture of two or more coupling components can be used.

The dyestuffs prepared according to the process of the invention can be taken alone or in mixture with one another or with other dyestuffs, preferably in the form of preparations, for example in aqueous dispersion or dissolved in organic solvents or in emulsion or dispersion that may contain in addition to a solvent or a mixture of solvents water, for dyeing and printing synthetic fiber materials, for example cellulose-diacetate, cellulose-2½-acetate and cellulose triacetate; polyamides, such as poly-ε-caprolactam or polyhexamethylenediamine-adipate, polyurethanes, polyolefines, polycarbonates, and especially polyesters, such as polyethylene terephthalates.

The synthetic fiber materials mentioned above can also be dyed and printed when they are in mixture with one another or with natural fiber materials, such as cellulose fibers or wool. They can also be dyed in various processing states, for examples as wovens, knits, combed material, flocks, threads, cables or fleeces.

The dyestuffs are applied in a manner known in principle, generally from aqueous dispersion, but also from organic solvents. The dyestuffs can be dispersed, for example, by grinding in the presence of dispersing agents, for example, a condensation product of formaldehyde and a naphthalenesulfonic acid. The dyeing conditions largely depend on the nature of the synthetic fiber materials and their processing state.

So, for example, shaped articles made of cellulose acetate are dyed in a range of temperature of 75° to 85° C., cellulose triacetate fibers are dyed at temperatures from about 90° C. to 125° C., polyamide fiber materials are dyed at temperatures from about 90° to 120° C.

To obtain intense dyeings on polyester fibers it is advantageous to add to the dyebath a swelling agent, for example o- or p-phenylphenol, methylnaphthalene or salicylic acid methyl ester and to work at temperatures within the range of 100° to 130° C., or to dye without the use of carriers at correspondingly higher temperatures, for example, within the range of from 120° to 140° C.

The dyestuffs may also be applied by padding with or without thickening agent, for example, a tragacanth thickener and fixed under the action of heat, for example, by steaming or with dry heat during about ½ to 30 minutes at temperatures within the range of from 100° to 230° C. The material so dyed is then freed from dyestuff adhering to the surface to improve the fastness to friction, for example, by rinsing or a reductive aftertreatment. The after-treatment is generally carried out at temperatures within the range of from 60° to 120° C. in a liquor containing an aqueous sodium hydroxide solution, sodium dithionite and a non-ionic detergent, for example, an addition product of ethylene oxide and phenol.

The synthetic fiber materials can be dyed from organic solvents, for example, in such a manner that the fiber is penetrated by the dyestuff from the solution at room temperature or above, preferably at about 70° to 130° C., optionally under pressure, or that wovens or knits are continuously impregnated by a dyestuff solution, dried and subjected to the action of heat, for example, at temperatures between 180° and 210° C. for a short time. Suitable solvents for the exhaustion method are, for example, solvents not miscible with water, having boiling points between 40° and 170° C., such as aliphatic halogenated hydrocarbons, such as methylene chloride, trichloroethane, trichloroethylene, perchloroethylene or trifluorotrichloroethane. Solvents miscible with water are especially suitable for a continuous dyeing method, for example, alcohols or dimethylformamide. The solvents may also be used in mixture with one another and may contain further auxiliaries miscible in solvents, for example, oxalkylation products of fatty alcohols, alkyl phenols and fatty acids.

To prepare prints on synthetic fiber materials, for example those made of polyesters, polyamides or cellulose triacetate, the dyestuffs of the invention may be used in the form of water-containing preparations which may contain in addition to the finely dispersed dyestuff suitable thickening agents and fixation accelerators. The fixation is effected, for example, after printing and drying by steaming under atmospheric pressure or under elevated pressure up to 2.5 atmg during 10 to 60 minutes, but also by the action of hot air of 160° to 210° C. during 30 seconds to 10 minutes.

The new dyestuffs yield on the synthetic fiber materials mentioned very good dyeings of high color intensity having very good fastnesses to wetting, sublimation, waste gas and light, and a very good color build-up. When blends of polyester fibers and wood are dyed, the new dyestuffs dye the woolen part, in most cases, only slightly, while a good color yield is obtained on the polyester portion. The woolen part can be freed from color by washing with emulsifiers or by treating with reduction agents.

The following Examples illustrate the invention:

EXAMPLE 1

Dyestuff of the formula:

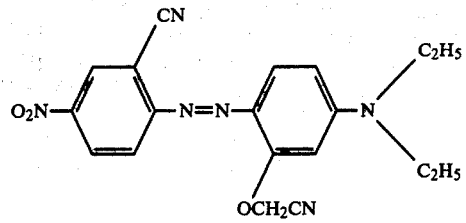

(a) Preparation of the coupling component:

In analogy to the synthesis of phenoxyacetone described in Houben-Weyl, Methoden der organischen Chemie, vol. 6/3, page 57 et seq., (Georg Thieme Verlag, Stuttgart, 1965) 16.5 g (0.1 mol) of 3-diethylaminophenol were reacted with 7.6 g (0.1 mol) of chloroacetonitrile in acetone in the presence of a fine powder of potassium carbonate. After filtration of the anorganic salts and distillation of the acetone, a dark oil was obtained that was used as coupling component in this form.

(b) Preparation of the dyestuff:

16.3 g (0.1 mol) of 2-cyano-4-nitroaniline were dissolved at 0° to 10° C. in 70 g of 98% sulfuric acid and diazotized at the same temperature by adding 32 g of a 40% by weight nitrosylsulfuric acid. The reaction was completed at about 5° C. during 2 hours.

The diazo solution was added dropwise to the coupling component obtained according to (a) to which about 100 ml of 2 N hydrochloric acid were added. During this operation, the temperature was maintained at 5° to 10° C. by adding about 500 g of ice. Coupling was completed by buffering with 4 N sodium acetate solution and stirred again for two hours. The precipitated dyestuff which corresponded to the formula mentioned above, was suction-filtered, washed with water until free of salt and acid and dried.

The dyestuff yielded on polyester, celluloseacetate and cellulose triacetate bordo dyeings and prints of high color intensity having very good fastness to light.

EXAMPLE 2

Dyestuff of the formula

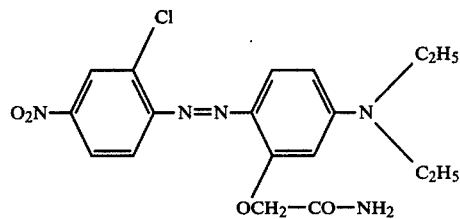

(a) Preparation of the coupling component:

The corresponding sodium phenolate was prepared from 3-diethylaminophenol and concentrated sodium hydroxide solution in toluene by centrifuging water and reacted at 80° C. with chloroacetamide in known manner. After extracting the toluene and reprecipitating the remaining substance from ethanol/water a crystalline product was obtained that melted at 99° to 100.5° C.

(b) Preparation of the dyestuff:

17.2 g (0.1 mol) of 2-chloro-4-nitroaniline were stirred with 40 ml of concentrated hydrochloric acid and 60 ml of water. After cooling to 0° to 5° C. 20 ml of 5 N aqueous sodium nitrite solution were added and the diazotization was completed by stirring for 1 hour.

At 0° to 5° C., the diazo solution was introduced into the coupling component dissolved in 2 N hydrochloric acid/glacial acetic acid and that was prepared according to (a). A sodium acetate buffer completed the coupling process. The precipitated dyestuff of the formula mentioned above was suction-filtered, washed with water until free of electrolytes and dried. The dyestuff yielded on polyester fibers dyeings and prints of reddish blue shade and a high color intensity having food fastness properties.

EXAMPLE 3

Dyestuff of the formula

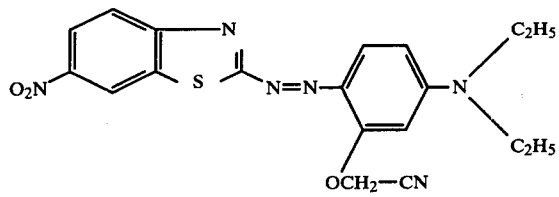

(a) Preparation of the coupling component:

Under the action of phosphoroxy chloride, water was separated in known manner from the carbonamide group of the coupling component prepared according to Example 2(a) while 3-(cyanomethoxy)-N,N-diethylaniline was formed. It was used as coupling component in the form of its hydrochloric solution.

(b) Preparation of the dyestuff:

19.5 g of 6-nitro-2-aminobenzothiazole were introduced in 90 ml of 85% phosphoric acid at room temperature and diazotized at −5° C. with 31.8 g of 40% nitrosylsulfuric acid. After stirring again for two hours, at −5° C., the diazo solution was added dropwise at 0° C. to −5° C. to the cooled coupling solution that was prepared according to (a). Coupling was completed by stirring for 1 hour, the dyestuff was precipitated with 200 ml of water and then it was suction-filtered after ½ to 1 hour, washed until free of acid and dried.

This dyestuff yielded on polyester, cellulosetriacetate, celluloseacetate and polyamide clear, bordo dyeings and prints having good fastness properties.

EXAMPLE 4

Dyestuff of the formula

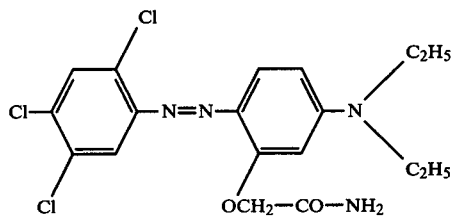

The coupling component was prepared according to Example 2(a).

Preparation of the dyestuff:

19.65 g (0.1 mol) of 2,4,5-trichloroaniline were stirred with 40 ml of concentrated hydrochloric acid and 60 ml of water. After cooling to 0° to 5° C., the mixture was diazotized with 20 ml of 5 N aqueous sodium nitrite solution, reaction being completed by stirring for about 30 minutes.

The diazo solution was introduced slowly into the coupling component dissolved in 2 N hydrochloric acid/glacial acetic acid prepared according to Example 2(a) and coupling was completed by buffering with sodium acetate.

The dyestuff isolated and dried in usual manner, yielded in finely dispersed form on polyester, cellulose acetate, cellulose triacetate and polyamide fibers intense, clear orange dyeings and prints having good processing properties.

EXAMPLE 5

Dyestuff of the formula

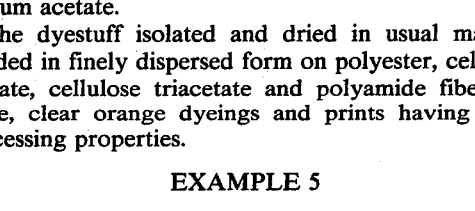

(a) Preparation of the coupling component:

16.5 g (0.1 mol) of 3-(N,N-diethylamino)-phenol were dissolved in 150 ml of toluene, 4 g of NaOH were added that were dissolved in a small amount of water, and the water was centrifuged out. At 70° to 80° C., 10.9 g (0.1 mol) of chloroacetic acid methyl ester were added dropwise, whereupon the solution turned dark brown. The solution was shaken with dilute sodium hydroxide solution and the toluene phase was washed several times with water. After extracting the toluene a dark oil was obtained which was used as coupling component in hydrochloric solution.

(b) Preparation of the dyestuff:

18.3 g (0.1 mol) of 2,4-dinitroaniline were dissolved in 60 ml of concentrated sulfuric acid and diazotized while cooling to 15° C. with 32 g of 40% nitrosylsulfuric acid. To complete the reaction, the solution was again stirred for 2 hours.

The diazo solution so obtained was added dropwise to the solution of the coupling component prepared according to (a).

To complete the reaction a sodium acetate buffer was added.

The dyestuff of the above formula which was isolated and dried in the usual manner, yielded on polyester and cellulose triacetate fibers violet dyeings and prints of high color intensity and having good fastness properties.

EXAMPLE 6

Dyestuff of the formula

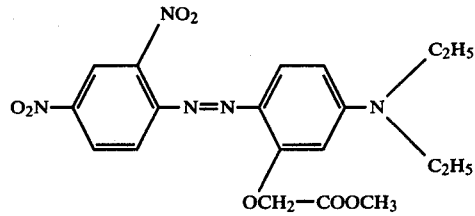

(a) Preparation of the coupling component:

16.5 g (0.1 mol) of 3-(N,N-diethylamino)-phenol were heated to the boil with 10.6 g (0.2 mol) of acrylonitrile and catalytical amounts of Triton B (trimethylbenzylammonium hydroxide) until the reaction, observed by thinlayer chromatography, was completed. After introduction in toluene, small amounts of starting product could be removed by shaking with 1 N NaOH. After extracting the toluene, a brownish oil was obtained that was used as coupling component in hydrochloric acid solution.

(b) Preparation of the dyestuff:

16.3 g (0.1 mol) of 2-cyano-4-nitroaniline were dissolved at 0° to 10° C. in 70 g of 98% sulfuric acid and diazotized at the same temperature by adding 32 g of a 40% by weight nitrosylsulfuric acid. To complete the diazotization, the solution was stirred again for 2 hours at about 5° C. The diazo solution was added dropwise to the hydrochloric acid coupling component obtained according to (a) and the temperature was maintained at 5° to 10° C. by adding gradually 500 g of ice. To complete the coupling process, a sodium acetate solution buffer was added.

The dyestuff of the formula mentioned above which was isolated and dried in the usual manner, yielded on polyester and cellulose triacetate fibers bordo dyeings and prints of high color intensity having very good fastness to light and to thermofixation.

EXAMPLE 7

Dyestuff of the formula

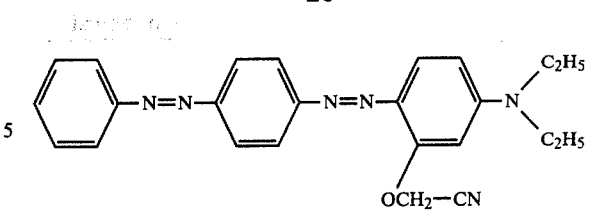

The coupling component was prepared according to Example 3(a).

Preparation of the dyestuff:

To a fine suspension of 19.7 g (0.1 mol) of 4-aminoazobenzene in 500 g of water were added 35 g of a 31% hydrochloric acid and the mixture was diazotized at 0° to 5° C. by adding an aqueous solution of 6.9 g of sodium nitrite in the usual manner.

The clarified diazonium salt solution was introduced into the hydrochloric acid coupling component prepared according to 3(a) at about 5° C. and the coupling was completed by buffering with a sodium acetate solution.

The dyestuff of the formula mentioned above yielded on polyester, cellulosetriacetate, cellulose acetate and polyamide fiber materials clear, red dyeings and prints of high color intensity and having good fastness properties.

The following Table compiles further dyestuffs which are obtained when the diazo components indicated in column 2 are diazotized according to the preceding Examples and reacted with the coupling components of column 3. The shade in column 4 is that one obtained on the fiber materials indicated in column 5 with the use of the new dyestuffs. (Abbreviations: PES=polyester, CT=cellulose triacetate, CA=cellulose acetate and PA=polyamide.)

| Example No. | Diazo component | Coupling component | Shade | Fiber |
|---|---|---|---|---|
| 8 | $O_2N$—⟨ ⟩—$NH_2$, $NO_2$ | ⟨ ⟩—$N(C_2H_5)_2$, $OCH_2CN$ | bordo | PES CT CA |
| 9 | $O_2N$—⟨ ⟩—$NH_2$, Cl, Cl | ⟨ ⟩—$N(C_2H_4OCOCH_3)_2$, $OCH_2CN$ | brown | PES CT |
| 10 | $O_2N$—⟨S,N⟩—$NH_2$ | $CH_3$—⟨ ⟩—$N(CH_3)_2$, $OCH_2CONH_2$ | blue | PES |
| 11 | $O_2N$—⟨ ⟩—$NH_2$, Cl, $NO_2$ | $OCH_2CN$—⟨ ⟩—$N(CH_3)_2$, $OCH_2CN$ | blue | PES CT |

-continued

| Example No. | Diazo component | Coupling component | Shade | Fiber |
|---|---|---|---|---|
| 12 | 2-amino-4-nitro-6-nitro-benzonitrile (CN, NH₂, O₂N, NO₂) | 4-(N-ethyl-N-hydroxyethylamino)-2-cyanomethoxy-acetanilide (OCH₂CN, C₂H₅, C₂H₄OH, NHCOCH₃) | greenish blue | PES |
| 13 | 2-amino-4-nitro-chlorobenzene (Cl, O₂N, NH₂) | N-ethyl-N-cyanoethyl-3-cyanoethoxyaniline (C₂H₅, C₂H₄CN, OC₂H₄CN) | red | PES |
| 14 | ethyl 4-aminobenzoate (H₅C₂O−CO−, NH₂) | 2-methyl-5-cyanomethoxy-N-ethyl-N-allylaniline (CH₃, C₂H₅, CH₂CH=CH₂, OCH₂CN) | orange | PES CT |
| 15 | 2-amino-5-methylsulfonyl-benzothiazole (CH₃O₂S, N, S, NH₂) | 2-(β-methoxycarbonylethoxy)-N,N-dimethylaniline (OCH₂CH₂COOCH₃, CH₃, CH₃) | bordo | PES CT CA |
| 16 | methyl 2-amino-5-nitro-benzoate (COOCH₃, O₂N, NH₂) | N-benzyl-N-acetoxyethyl-3-cyanomethoxyaniline (CH₂Ph, C₂H₄OCOCH₃, OCH₂CN) | red | PES |
| 17 | CH₃O₂S−N=S (thiadiazole) NH₂ | 2-methyl-5-(β-methoxycarbonylethoxy)-N,N-dimethylaniline (CH₃, CH₃, CH₃, OCH₂CH₂COOCH₃) | bluish red | PES |
| 18 | 2-amino-3-bromo-5-nitro-benzonitrile (Br, O₂N, NH₂, CN) | coupling (OCH₂COOCH₃, CH₃, CH₃, NHCOOC₂H₅) | blue | PES CT |
| 19 | 2-amino-4-nitro-benzonitrile (CN, O₂N, NH₂) | N,N-diethyl-2-methoxy-5-carbamoylmethoxy-aniline (OCH₃, C₂H₅, C₂H₅, OCH₂CONH₂) | violet | PES |
| 20 | 2-amino-3-bromo-5-nitroaniline (Br, O₂N, NH₂) | N,N-bis(acetoxyethyl)-3-carbamoylmethoxy-aniline (C₂H₄OCOCH₃, C₂H₄OCOCH₃, OCH₂CONH₂) | red | PES CT |
| 21 | 2-amino-3-nitro-5-nitro-aniline (NO₂, O₂N, NH₂) | 2-chloro-5-(β-methoxycarbonylethoxy)-N-(β-methoxycarbonylethyl)aniline (Cl, NHC₂H₄COOCH₃, OCH₂CH₂COOCH₃) | red | PES |

-continued

| Example No. | Diazo component | Coupling component | Shade | Fiber |
|---|---|---|---|---|
| 22 | Br, O₂N–, NH₂, NO₂ (phenyl) | OCH₂CONH₂, N(C₂H₅)₂, NHCHO (phenyl) | blue | PES CT |
| 23 | COOCH₃, O₂N–, NH₂ (phenyl) | CH₃, N(C₂H₅)₂, OCH₂CN (phenyl) | red | PES |
| 24 | CN, O₂N–, NH₂ (phenyl) | N(C₂H₅)₂, OCH₂CH₂CN (phenyl) | bordo | PES |
| 25 | O₂N–benzisothiazole–NH₂ | N(C₂H₅)₂, OCH₂CN (phenyl) | greenish blue | PES CT |
| 26 | O₂N–, NH₂ (phenyl) | N(C₂H₄OCOCH₃)₂, OCH₂CN (phenyl) | orange red | PES CT |
| 27 | Cl, O₂N–, NH₂, Cl (phenyl) | OC₂H₄COOCH₃, N(C₂H₄COOCH₃)(CH₃), Cl (phenyl) | yellow brown | PES CT CA |
| 28 | Cl, O₂N–, NH₂, NO₂ (phenyl) | OCH₂CN, N(CH₃)₂, NHCOCH₃ (phenyl) | blue | PES |

We claim:
1. Azo-dyestuff of the formula

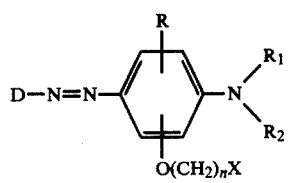

in which
D represents nitrophenylene,

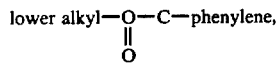

dinitro-phenylene, nitro-cyano-phenylene, nitro-chloro-phenylene, nitro-bromo-phenylene, tri-chloro-phenylene, nitro-dichloro-phenylene, dinitro-chloro-phenylene, dinitro-cyano-phenylene, nitro-bromo-cyano-phenylene and dinitro-bromo-phenylene, R represents hydrogen, chlorine, lower alkyl, lower alkoxy, —O—CH₂—CN, —NH—CO-lower alkyl, —NH—COO lower alkyl or

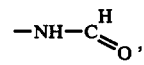

n stands for the integer 1 or 2, X represents cyano, —CO—NH₂ or —COO-lower alkyl, $R_1$ represents hydrogen, lower alkyl, lower alkylene-OH, lower alkylene-CN, lower alkylene-OCO-lower alkyl or lower alkenyl, and $R_2$ represents lower alkyl, lower alkylene-O-CO-lower alkyl or lower alkylene-COO-lower alkyl.

2. The dyestuff of the formula

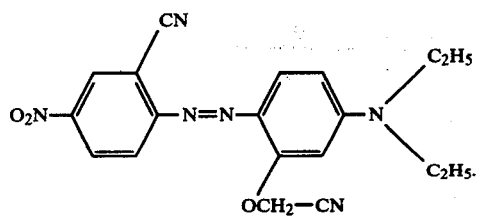
3. The dyestuff of the formula
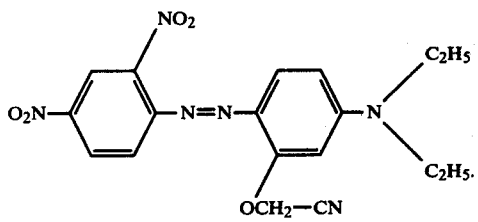
4. The dyestuff of the formula
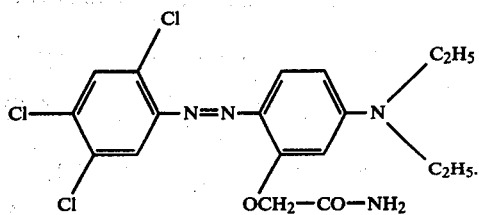
5. The dyestuff of the formula
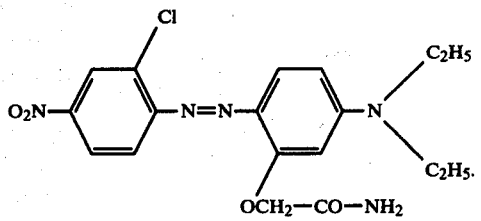
* * * * *